US009819811B2

(12) United States Patent
Rotem

(10) Patent No.: US 9,819,811 B2
(45) Date of Patent: *Nov. 14, 2017

(54) SYSTEMS AND METHODS FOR IMPROVING TELECOMMUNICATIONS DEVICE EXPERIENCES

(71) Applicant: T-Mobile USA, Inc., Bellevue, WA (US)

(72) Inventor: Eyal Rotem, Bellevue, WA (US)

(73) Assignee: T-Mobile USA, Inc., Bellevue, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/162,710

(22) Filed: May 24, 2016

(65) Prior Publication Data

US 2016/0269569 A1    Sep. 15, 2016

Related U.S. Application Data

(63) Continuation of application No. 14/210,014, filed on Mar. 13, 2014, now Pat. No. 9,408,056.

(Continued)

(51) Int. Cl.
*H04M 11/00* (2006.01)
*H04M 15/00* (2006.01)
(Continued)

(52) U.S. Cl.
CPC ........ *H04M 15/80* (2013.01); *H04L 12/1492* (2013.01); *H04M 15/58* (2013.01);
(Continued)

(58) Field of Classification Search
USPC ............ 455/404.2, 405, 406–408, 410–411, 455/412.2, 415, 432.1, 435.1
See application file for complete search history.

(56) References Cited

U.S. PATENT DOCUMENTS 7,450,927 B1    11/2008 Creswell et al.
8,538,379 B1 *  9/2013 Stachiw ................ H04M 15/43
                                                         379/114.01

(Continued)

FOREIGN PATENT DOCUMENTS

JP    2002523841    7/2002
JP    2002528966    9/2002
KR    1020060072121  6/2006

OTHER PUBLICATIONS

The Extended European Search Report dated Oct. 27, 2016 for European patent application No. 14769277.6, 12 pages.

(Continued)

*Primary Examiner* — Dai A Phuong
(74) *Attorney, Agent, or Firm* — Lee & Hayes, PLLC

(57) ABSTRACT

Systems and methods for providing a better user experience and provider profitability. An exemplary system includes a telecommunications device subject to a cellular service plan from a cellular carrier. The telecommunications device includes an application program that gathers device usage data and determines whether the current cellular service plan is the best service plan based on gathered usage data. If a current cellular service plan is not the best service plan, based on the gathered usage data, then cellular service plans from the current cellular service provider or other service providers are measured against the gathered device-usage data to determine the best available service plan.

17 Claims, 6 Drawing Sheets

Related U.S. Application Data

(60) Provisional application No. 61/800,017, filed on Mar. 15, 2013.

(51) Int. Cl.
*H04W 4/24* (2009.01)
*H04L 12/14* (2006.01)

(52) U.S. Cl.
CPC ... *H04M 15/8022* (2013.01); *H04M 15/8027* (2013.01); *H04M 15/8038* (2013.01); *H04M 15/8044* (2013.01); *H04M 15/83* (2013.01); *H04M 15/8351* (2013.01); *H04M 15/858* (2013.01); *H04W 4/24* (2013.01); *H04L 12/1417* (2013.01); *H04M 2215/34* (2013.01)

(56) References Cited

U.S. PATENT DOCUMENTS

| | | | |
|---|---|---|---|
| 8,615,220 B2* | 12/2013 | Gaikwad | H04W 4/028 455/406 |
| 8,868,058 B2* | 10/2014 | Morrill | H04W 24/02 370/310 |
| 9,565,543 B2* | 2/2017 | Raleigh | H04M 15/00 |
| 2003/0013434 A1* | 1/2003 | Rosenberg | G06Q 20/14 455/414.1 |
| 2003/0114105 A1 | 6/2003 | Haller et al. | |
| 2005/0020243 A1* | 1/2005 | Benco | H04W 8/18 455/406 |
| 2009/0054030 A1 | 2/2009 | Golds | |
| 2011/0158408 A1 | 6/2011 | Draznin | |
| 2012/0021776 A1* | 1/2012 | Phillips | G06Q 30/0282 455/456.3 |
| 2012/0157112 A1* | 6/2012 | Erb | H04M 3/42153 455/456.1 |
| 2012/0196566 A1 | 8/2012 | Lee et al. | |
| 2012/0276867 A1 | 11/2012 | McNamee et al. | |
| 2012/0282890 A1* | 11/2012 | Gaikwad | H04W 4/028 455/406 |
| 2012/0309344 A1* | 12/2012 | Ferrazzini | H04M 1/72519 455/406 |
| 2012/0329425 A1 | 12/2012 | Velusamy et al. | |
| 2013/0078978 A1* | 3/2013 | Booth | H04W 8/20 455/418 |
| 2013/0132854 A1* | 5/2013 | Raleigh | G06F 3/0482 715/738 |
| 2013/0150073 A1* | 6/2013 | Jovicic | G01S 5/0252 455/456.1 |
| 2014/0162593 A1* | 6/2014 | Young | H04L 41/5029 455/405 |
| 2014/0220942 A1 | 8/2014 | Vance et al. | |
| 2014/0273942 A1 | 9/2014 | Rotem | |
| 2014/0315516 A1 | 10/2014 | Peng et al. | |
| 2014/0349617 A1* | 11/2014 | Li | H04W 8/20 455/411 |
| 2015/0004959 A1 | 1/2015 | Bush et al. | |
| 2015/0140989 A1 | 5/2015 | Leemet et al. | |
| 2015/0156335 A1 | 6/2015 | Gautier et al. | |
| 2015/0215786 A1 | 7/2015 | Raleigh | |
| 2015/0223044 A1* | 8/2015 | Rege | H04W 4/26 455/405 |
| 2016/0044493 A1 | 2/2016 | Schell et al. | |

OTHER PUBLICATIONS

Office action for U.S. Appl. No. 14/210,014, dated Oct. 1, 2015, Rotem, "Systems and Methods for Improving Telecommunications Device Experiences", 17 pages.

The PCT Search Report and Written Opinion dated Jul. 24, 2014 for PCT application No. PCT/US14/27539, 13 pages.

* cited by examiner

SYSTEMS AND METHODS FOR IMPROVING TELECOMMUNICATIONS DEVICE EXPERIENCES

RELATED APPLICATIONS

This application is a continuation of U.S. patent application Ser. No. 14/210,014 filed Mar. 13, 2014, which claims priority to U.S. provisional patent application No. 61/800,017, entitled "A Cellular Application for Enabling Carriers to Offer and Enter Into New Contract based on Expected Consumer Profitability" and filed on Mar. 15, 2013. Application Ser. Nos. 14/210,014 and 61/800,017 are fully incorporated herein by reference.

BACKGROUND

A user who is not properly matched to his cellular plan increases risk to the service provider that the user will refuse to pay his bill, when it is higher than expected and includes charges that the user does not understand. Also, a customer faced with apparently mysterious charges may place excessive calls to customer care, thereby driving up those costs. Ultimately, a customer who is unhappy about high bills that he does not understand may switch to another carrier.

When cell phone users are looking for other plans, they can only receive information about the plans a cellular carrier might have that are based only on public information, such as a credit score. Credit score information provides only a small part of the total information that would permit a full evaluation of the desirability of acquiring a particular user by a prospective cellular carrier.

Thus, the user can find other service plans but has no idea how those plans would or would not save him money. Accordingly, the users frequently take the easiest path and recontract with their current carrier.

When a cellular service provider is trying to attract potential (dissatisfied) users it does not know if a user is likely to be highly profitable, slightly profitable, or will cause a net loss to the carrier. Abusive use of unlimited plans is an example, but certainly only one of many examples, of costs that might result in a customer causing a net loss for the cellular carrier.

BRIEF DESCRIPTION OF THE DRAWINGS

The detailed description is set forth with reference to the accompanying figures. The use of the same reference numbers in different figures indicates similar or identical items or features.

DETAILED DESCRIPTION

Overview

Figure 1:
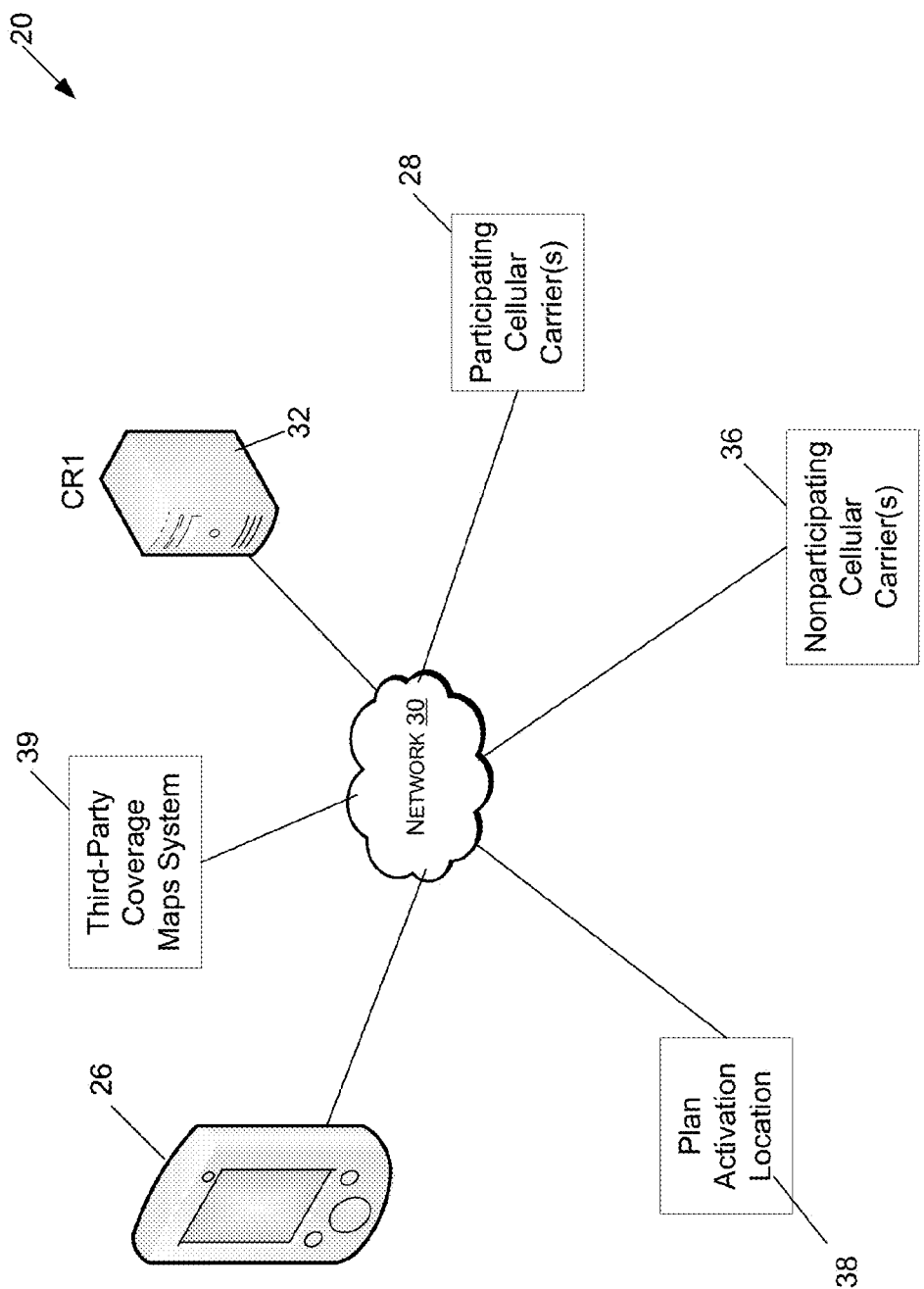
FIG. 1 illustrates an exemplary environment including a telecommunications device configured with an application program formed in accordance with an embodiment of the present invention.

This disclosure describes, in part, an application program implemented at a telecommunications device to perform a determination of whether other telecommunication (i.e., cellular) plans provide a better value to the user of the telecommunications device and providers of telecommunications services.

In various embodiments, the telecommunications device receives an application program that includes cellular plan information for one or more cellular carriers (domestic). The application program analyzes usage/operational (including network coverage info) information of the telecommunications device relative to publicly available cellular plans and/or generates a customized cellular plan(s) by applying the usage/operational information to a participating carrier-designed algorithm(s). The usage/operational information of the telecommunications device may include a wide variety of usage information, such as cellular carrier use during operation, signal strength of the cellular carriers accessed during usage volume of calls and data used within each billing period, locations where usage occurred, etc. As a result of the analysis, the application program outputs to the user of the telecommunications device information about whether there are better cellular plans available for the user's particular usage. The application program then may allow the user to activate one of these suggested alternate cellular plans, either via a the application itself (for the participating carriers), by a network connection with the particular cellular carrier or by performing activation at a remote site, such as a store.

In various embodiments, the application program of the telecommunications device may send packets of information to a controlling server via a network connection. The packets of information relate to the application program process described above. The controlling server will analyze the information within the packets to determine whether the algorithm(s) performed properly and determine a reason for any improper performance of the algorithm(s).

Exemplary Environment and Devices

In one embodiment, an exemplary system 20 includes a plurality of user telecommunications devices 26, at least one server (CR1) 32 and optionally one or more participating carriers 28 that are all in communication over some form of network 30 or combination of networks (e.g., telecommunications, public (Internet) or private). Optionally, the system 20 includes one or more non-participating carriers 36, a plan activation location (e.g., a store front associated with one of the participating carriers 28) 38 or a third-party map coverage system 39.

The telecommunications devices 26 are currently operating under a previously selected telecommunications plan. The telecommunications device 26 manually or automatically receives an application program updates from a CR1 32. The CR1 32 generates the application program after having retrieved public plan information for participating and non-participating carriers 28, 36 and having received proprietary eligibility algorithms from the participating carriers 28. After a predefined event, periodically or just at random, the telecommunications device 26 executes the application program. The application program retrieves a plurality of operational (usage) information from the telecommunications device 26 and runs that retrieved information through the proprietary eligibility algorithms and other algorithms that relate to the retrieved public plan information. The application program determines whether there are other cellular plans (public or customized offers) that would provide a greater benefit for the associated user. The results of this determination are presented to the user in a number of different ways.

In a stealth mode of operation, the user does not send any of the operational information to any entity over the network 30. All data/information gathered at the telecommunications device 26 remains at the telecommunications device 26. If the user desires to activate a customized offer that was included in the application program results, then the user has the option to perform the activation by sending the user's plan choice with a verification code to CR1 32. The user also has the option not to send his selection and just show the device screen with the offer, his subscriber number and the verification code at a store of his selected carrier. The application program generates the verification code for each presented plan according to a unique code included in the application program. If CR1 32 checks that the verification code is proper (i.e., CR1 32 performs code verification, for a description see http://pecos.ices.utexas.edu/research/activities/code-verification/), then CR1 32 informs the respective participating carrier 28 of the user choice, if the user had preferred to complete his choice by the application. The participating carrier 28 then completes the activation of the new plan. Alternatively, the user may present the user's plan choice with the verification code to the plan activation location 38 associated with the participating carrier 28. The plan activation location 38 sends the user's plan choice with the verification code to CR1 32 and the process is completed as described above or CR1 32 sends a valid offer signal back to the plan activation location 38, which then completes activation directly with its carrier 28.

In a debug mode of operation, upon user approval, operational information of the telecommunications device 26 and application program information, data, and results are sent to CR1 32. Then, CR1 32 analyzes the sent operational information to determine if the application program is operating properly. CR1 32 attempts to determine a reason for any determined operational failure.

These modes of operation and the information used by the application program will be described in more detail below.

Figure 2:
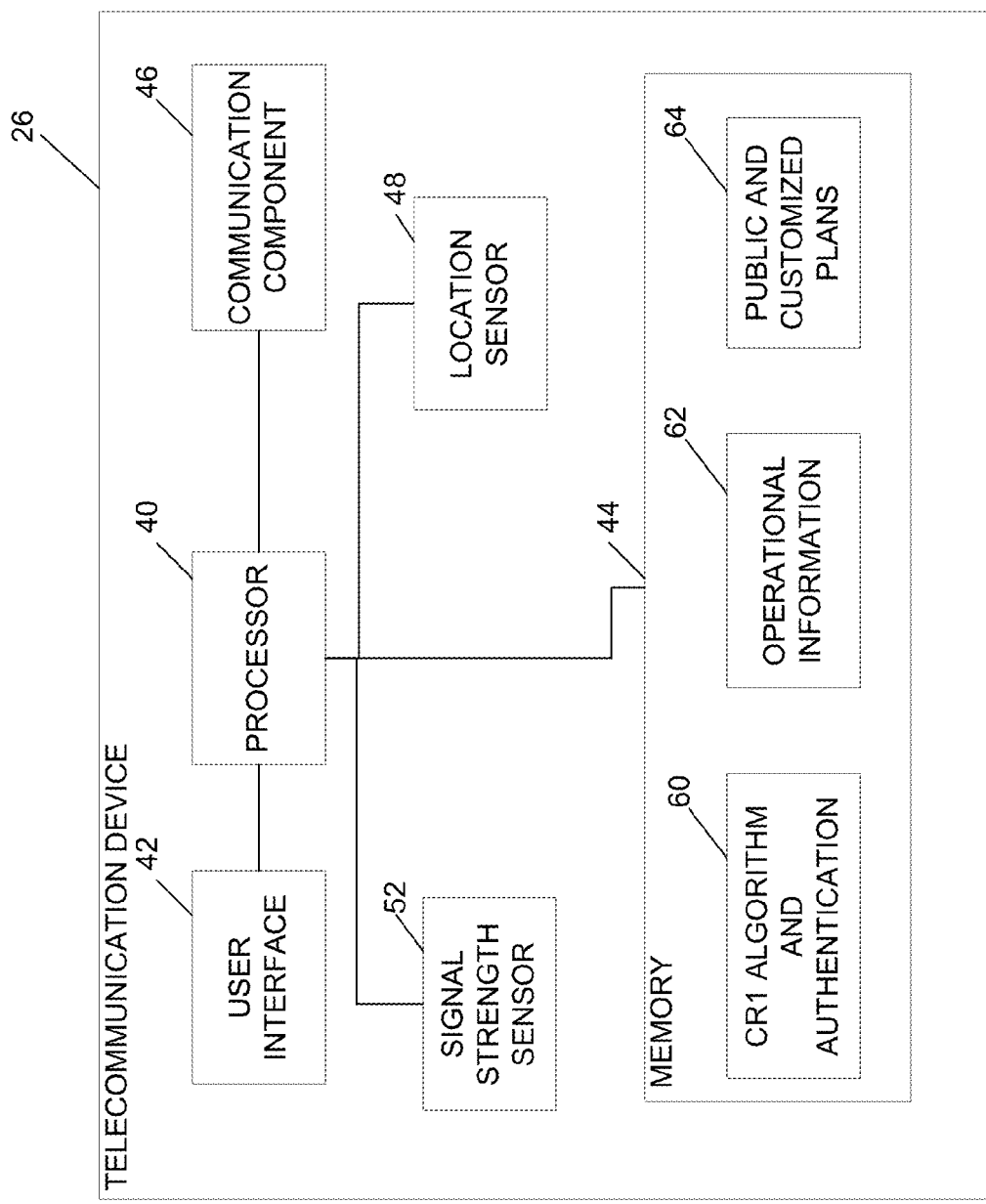
FIG. 2 illustrates a component-level view of a telecommunications device equipped with an application program formed in accordance with an embodiment of the present invention.

As shown in FIG. 2, the telecommunications device 26 includes a processor 40 that is in signal communication with a user interface 42, a memory device 44, a communication component 46 (i.e., radio(s)), a location sensor 48, and a signal strength sensor 52 (optional). The memory device 44 includes a plan option application program that includes a CR1 algorithm(s) and authentication information 60, operational information 62 and public plan and/or customized plan information 64.

The public plan and/or customized plan information 64 includes plans publicly available by searching the Internet or customize plan information previously provided to CR1 32 by the particular participating carrier 28.

The operational information 62 includes technical information, geographical information and usage information. The usage information (i.e., usage statistics) for the telecommunications device 26 includes information received from the processor 40 and/or the other components, such as information received from external sources via the communication component 46, signal strength information from the signal strength sensor 52 (which may be included in the processor 40 or the communication component 46), position information from the location sensor 48 and/or other components. Exemplary usage information includes number and length of time of calls and SMS messages, data usage, calls to a care center, calls to international destinations, etc.

Exemplary technical information includes information regarding the user's current cellular plan (e.g., cellular provider, current plan, number of minutes used, time left on current plan, etc.). Exemplary geographic information includes signal strength maps for the current cellular provider and other cellular providers, which may be retrieved from the third-party coverage maps system 39. The technical information includes the user's contract details recorded at the time of contract execution. Alternatively, the application program either interrogates the user or analyzes other information without bothering the user to get service contract information that includes the contract expiration date information among other information. The application program gathers usage information.

The CR1 algorithm(s) and authentication information 60 is information provided by CR1 32. The CR1 32 provides updates of the algorithm(s) and authentication information 60 whenever updates are available. The CR1 algorithm(s) and authentication information 60 includes algorithms provided by each of the participating carriers 28. Each algorithm provided by of the participating carriers 28 is a proprietary program designed or parameters defined by each of the participating carriers 28 for analyzing the operational information 62 in order to determine whether there is a current plan provided by the particular participating carrier 28 or the participating carrier 28 can generate a customized plan that is financially beneficial to the customer based on the technical and usage information based on that data. The CR1 algorithm(s) and authentication information 60 also includes some form of authentication code.

In various embodiments, the telecommunications device 26 may be any sort of device capable of cellular or wireless network communication, such as a cellular phone, a tablet computer, a personal digital assistant (PDA), a personal computer (PC), a laptop computer, a media center, a work station, etc. The telecommunications device 26 may be associated with a subscription to telecommunication services of a network operator (i.e., the current cellular carrier 27) of the network 30.

In some embodiments, the telecommunications device 26 includes an operating system that may be any sort of telecommunications device operating system, such as an iOS®, an Android® operating system, a Windows® operating system, or a Unix-based operating system. In some embodiments, the operating system may expose or otherwise make available any of device information, network information, or user preferences.

In some embodiments, the processor 40 is a central processing unit (CPU), a graphics processing unit (GPU), or both CPU and GPU, or any other sort of processing unit.

In various embodiments, the memory 44 is volatile (such as RAM), nonvolatile (such as ROM, flash memory, etc.) or some combination of these. The telecommunications device 26 may also include additional data storage devices (removable and/or nonremovable) such as, for example, magnetic disks, optical disks, or tape. Tangible computer-readable media may include volatile and nonvolatile, removable and nonremovable media implemented in any method or technology for storage of information, such as computer-readable instructions, data structures, program modules, or other data. The memory 44, removable storage and nonremovable storage are all examples of computer-readable storage media. Computer-readable storage media include, but are not limited to, RAM, ROM, EEPROM, flash memory, or other memory technology, CD-ROM, digital versatile disks (DVD) or other optical storage, magnetic cassettes, magnetic tape, magnetic disk storage or other magnetic storage devices, or any other medium that can be used to store the desired information and which can be accessed by the telecommunications device 26. Any such tangible computer-readable media may be part of the telecommunications device 26.

In some embodiments, the communication component 46 (i.e., radio) includes any sort of radio known in the art. For example, communication component 46 may include a radio transceiver that performs the function of transmitting and receiving radio frequency communications via an antenna. The communication component 46 may facilitate wireless connectivity between the telecommunications device 26 and various cell towers, base stations and/or access points of the network 30. In addition, the telecommunications device 26 may also include a wireless communication transceiver and a near field antenna for communicating over unlicensed wireless IP networks, such as local wireless data networks and personal area networks (e.g., Bluetooth or near field communication (NFC) networks) that may provide a direct connection to the Internet 34.

In some embodiments, the user interface 42 has output devices that include any sort of output devices known in the art, such as a display (e.g., a liquid crystal display), speakers, a vibrating mechanism, or a tactile feedback mechanism. Output devices also include ports for one or more peripheral devices, such as headphones, peripheral speakers, or a peripheral display.

In various embodiments, the user interface 42 may also include input devices that include any sort of input devices known in the art. For example, input devices may include a camera, a microphone, a keyboard/keypad, or a touch-sensitive display. A keyboard/keypad may be a pushbutton numeric dialing pad (such as on a typical telecommunications device), a multikey keyboard (such as a conventional QWERTY keyboard), or one or more other types of keys or buttons, and may also include a joystick-like controller and/or designated navigation buttons, or the like.

In various embodiments, the location sensor 48 includes a global positioning system (GPS) that has functionality and logic capable of wirelessly communicating with a GPS system to receive GPS information, such as GPS coordinates, from the GPS system. The GPS exposes those GPS locations to the processor 40. In another embodiment, the location sensor 48 attains rough location information based on location of the cellular tower that the device is currently communicating with.

In one embodiment, the telecommunications device 26 is originally provided with the application program already installed or the application program may be installed as part of a customization process performed by the telecommunications device manufacturer or by the current cellular carrier.

In some embodiments, the CR1 32 (i.e., a server computer) may be an edge device of the core network and may communicate with another device of the core network, such as a gateway GPRS (general packet radio service) support node (GGSN), a serving gateway (SGW), or packet data network gateway (PGW). The access networks of the network 30 may each be associated with a specific geographic area (e.g., a cell, a macrocell, a microcell, a femtocell, etc.). In some embodiments, the network 30 may be a cellular network having a spectrum to allocate for cellular communications.

Exemplary Processes

Figure 3:
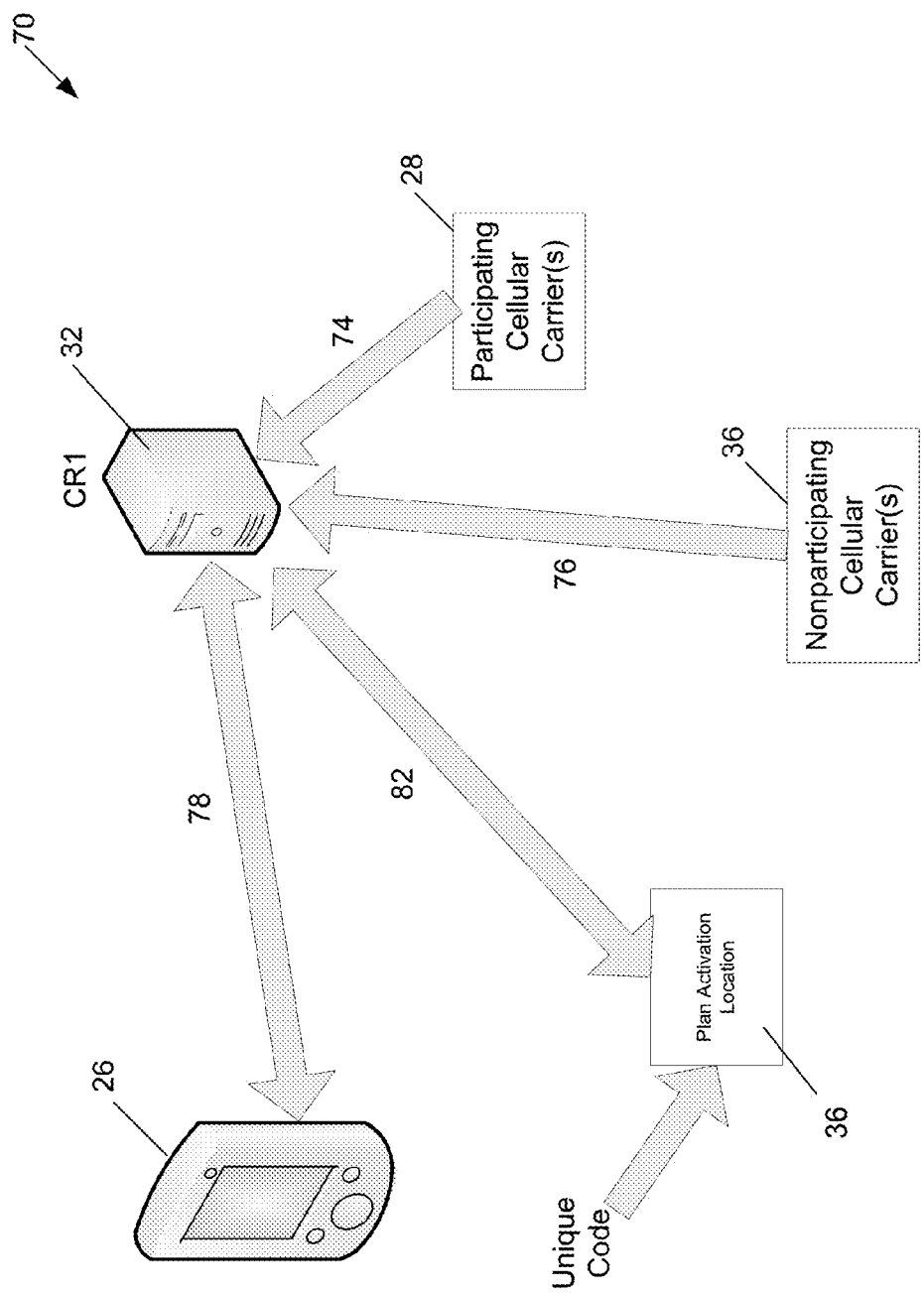
FIG. 3 is a communication flow pictorial as it relates to components of the system shown in FIGS. 1 and 2.
Figure 4:
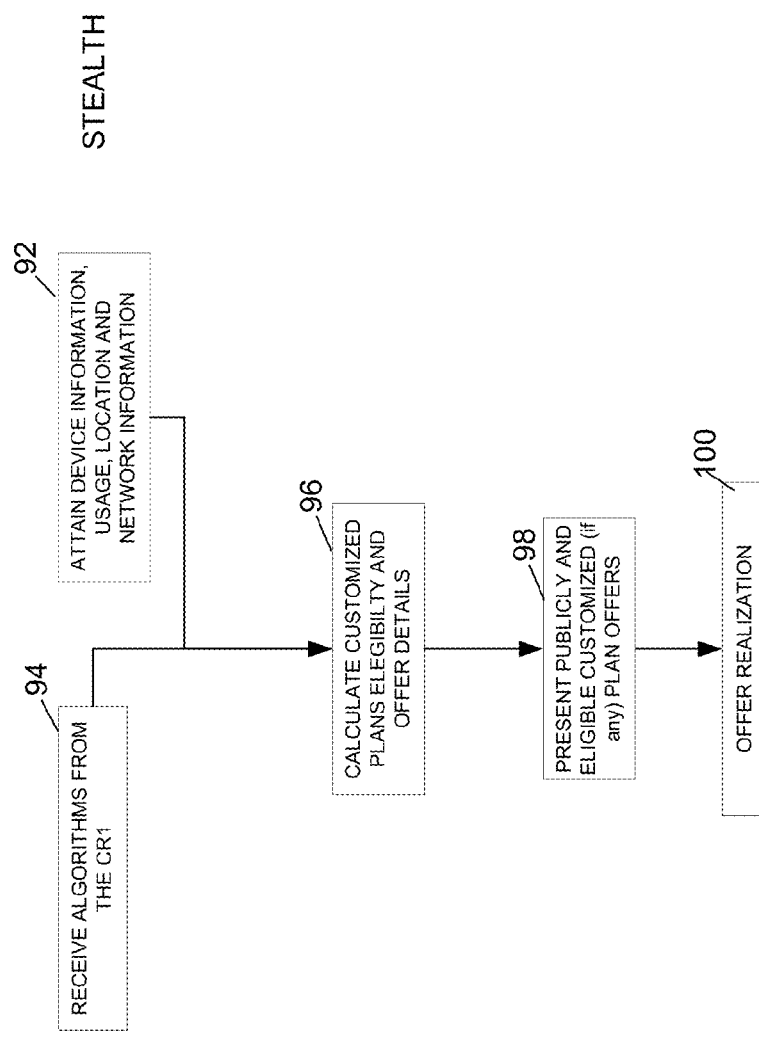
FIG. 4 is a processing flow diagram between the telecommunications device and a remote server (CR1) as it relates to FIG. 3.

FIG. 3 illustrates a data flow pictorial and FIG. 4 illustrates a data flowchart of an exemplary process 70 performed by components of the system 20 as it relates to the stealth mode of operation. Each operation of the process represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

First, at a block 94, the plan option application program (i.e., the algorithm(s) and authentication information 60 or the public plan and/or customized plan information 64) is sent from the CR1 32 is downloadable through another source (e.g., play store) to the device 26 along a communication path 78 between the device 26 and CR1 32. In parallel with the step performed at block 94, operational information of the device 26 is obtained at a block 92. Next, at a block 96, the processor 40 executes the CR1 algorithm(s) to calculate whether any of the public plans when compared with the operational information 62 provide a viable option for the current user. This may be as simple as comparing the number of minutes to what those costs might look like in each of the public plans. This may also include a coverage analysis performed by comparing location information of the device 26 to coverage maps available publicly or received from the third-party coverage maps system(s) 39. Also, the executed CR1 algorithm(s) calculate whether any of the associated participating carriers 28 can produce a customized plan that is eligible based on a comparison or an analysis of the operational information 62. In one embodiment, production of a customized plan includes determining an average customer cash cost per user (CCPU). The CCPU uses a variety of the operational information 62 in order to determine the costs that may be incurred by the carrier for the associated user. Some of the operational information 62 that the CCPU uses includes percentage of bad debt information, carrier tenure information, calls to customer care or contract history, derived information, such as suspension history or any other information the carrier believes adds cost. The determination by the CR1 algorithm(s) whether a customized plan can be offered also analyzes an associated network coverage map associated with the user location information, international calling information, information regarding phones the user has previously owned, other technical information and/or other carriers' plans.

At a block 98, the user is presented with any public and/or customized plans that are determined better than the user's current plan or are just considered a good offer. At a block 100, offer realization occurs after a user decides that they wish to activate one of the presented plans. In one embodiment, the offer realization occurs between CR1 32 and the device 26 along a communication path 78 once the user has made a selection from a graphical user interface presented on the user interface device 42. Upon selection of one of the presented plans, information regarding the selected plan and authentication information are sent to CR1 32. The authentication information (code) is calculated by the application program (i.e., algorithm) based on the previously received unique authentication code as well as other information, such as the current phone number associated with the user or information related directly to the selected plan. Then, CR1 32 analyzes the received authentication information to determine whether it is valid. If the authentication information is determined to be valid, CR1 32 sends instructions to the participating carrier 28 associated with the selected plan. Then, that participating carrier 28 activates the newly selected plan. Activation of the newly selected plan may include sending an instruction to the user of the device 26 to proceed to an affiliated store, such as the plan activation location 38, in order to pick up a new phone that was part of the newly selected plan.

Another offer realization includes presenting instructions on the user interface device 42 (i.e., a mapping program) to proceed to the (nearest) plan activation location 38 that is associated with the participating carrier 28. At the plan activation location 38 the user provides either directly or indirectly the authentication information and selected plan information to a local computing device (communication path) that is in data communication with CR1 32 along communication path 82. CR1 32 then performs the verification step as described in the previous embodiment. CR1 32 provides a positive verification along the communication path 82 back to the plan activation location 38. The plan activation location 38 or CR1 32 communicates with the participating carrier 26 in order to inform them of the selected plan upon positive verification.

Also shown in FIG. 3 is a communication path 74 between the participating carriers 28 and CR1 32. Along the communication path 74, each of the participating carriers 28 provides their proprietary algorithm as described above. CR1 32 may also pull public plan information from Web sites associated with the participating carriers 28 along the communication path 74 and pull public plan information from Web sites associated with the non-participating carriers 36 along a communication path 76.

Figure 5:
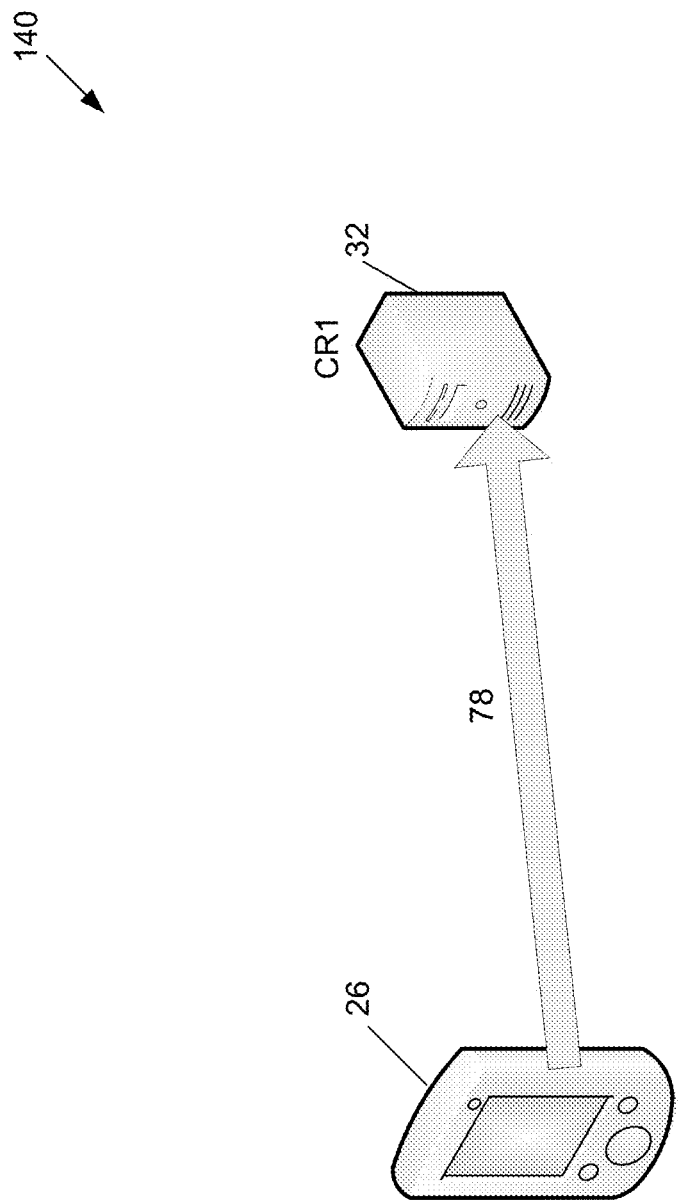
FIG. 5 is a communication flow pictorial as it relates to components of the system shown in FIGS. 1 and 2 in a "Debug mode" combined in some of embodiments with offer realization.
Figure 6:
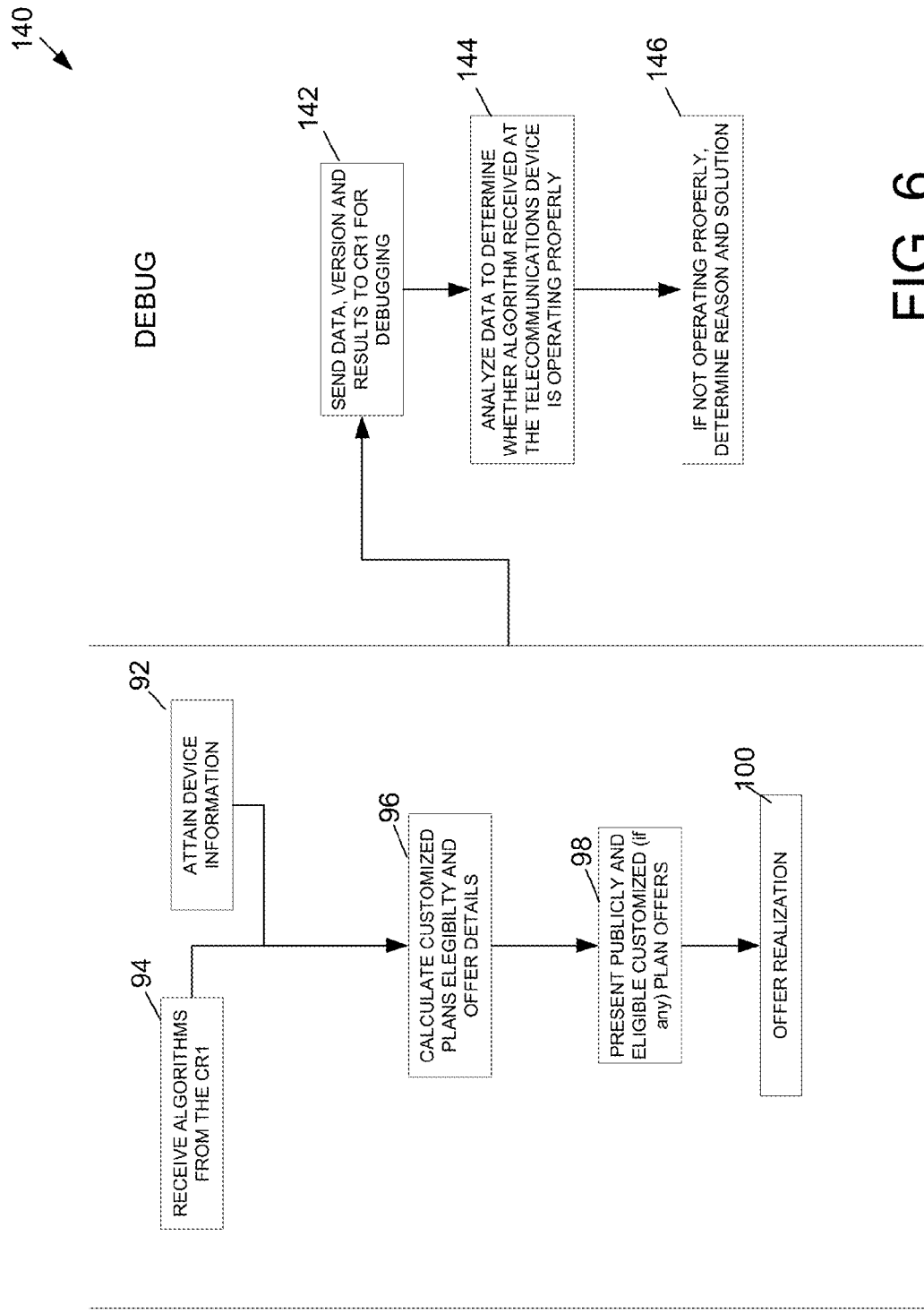
FIG. 6 is a processing flow diagram as it relates to FIG. 5.

FIG. 5 illustrates a data flow pictorial and FIG. 6 illustrates a data flowchart of an exemplary process 140 performed by components of the system 20 as it relates to the debug mode of operation. In one embodiment, the user is provided a choice of which mode to operate in. If the user selects the debug mode, the user may be provided with some form of benefit. In the debug mode of operation, the steps as described above with regard to FIG. 4 occur without change. However, while the process steps 92-100 are occurring the processor 40 is instructed by a debug application program to send a variety of information to CR1 32 for analysis along the communication path 78, see block 142. The variety of information sent to CR1 32 includes, but is not limited to, computer information, application program information, selected offer information, operational information, presented offers, and/or a screenshot(s) presented by the user interface 42 at various stages of operation. The computer information may include information regarding the device 26, the operating system executed on the device 26, amount of memory available, amount of free memory available, version numbers of the device 26, the operating system and/or information regarding other concurrently running software programs. The application program information includes versions of the algorithms included within the application program and/or memory usage associated with the application program. The selected offer information includes details of the offer selected and/or the verification code associated with presented or selected offer or with the algorithm used to generate the customize offers. At a block 144, CR1 32 analyzes the data received from the device 26 to determine whether the application program and associated algorithms are operating properly. In other words, CR1 32 determines if the application program running on the telecommunications device 26 is doing exactly what it's designed to do. If CR1 32 determines that the application program and associated algorithms are not operating properly, CR1 32 determines the reason for the problem and any possible solutions, at a block 146.

Other Embodiments

In one embodiment, the application program compares usage information against the service plan terms and informs the user about accumulated charges either periodically, each time a threshold of service charges is exceeded, or each time a rate of accumulation of service charges is exceeded. In one embodiment, the application program provides a qualitative indicator, showing if charge creation is low, normal, high, or very high (for example, in the case of data usage while roaming internationally). For example, an indicator icon is presented as green for low usage, yellow for normal usage, red for high usage, and flashing red for very high usage. Other graphical objects, colors, effects, etc. may be used for conveying similar differences in usage.

In one embodiment, if the user has given permission, then calls to carriers other than his current carrier cause the application program to initiate the request for bids process described above.

In one embodiment, the application program informs the user through a pop-up display when the charge accumulation rate exceeds normal usage. In a further embodiment, the application program gives a warning about the generated calls, displays a warning to the user of the expense that will incur, and/or gives the user the opportunity to continue the usage by pressing a button. In another embodiment, a code must be entered to approve the expensive usage, thereby preventing anyone using the cell phone from incurring the charges, without the consent of the user.

Monitored financial expenses might include: usage overage, roaming charges, international roaming charges, monthly recurring charges, one-time charges (like ringtone purchases), premium services, 411 calls, etc.

Also, in one embodiment, the service contract includes a provision that the carrier will charge only for extra services for which the user was advised of the expense, by way of the application. This provision will help to avoid expensive disputes and foster customer loyalty.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
    storing, with a memory of a telecommunications device, a plan option application program comprising public plan information associated with one or more public plans;
    obtaining, with a processor of the telecommunications device, operational information associated with the telecommunications device, the operational information comprising at least one of location information;
    determining, with the processor, whether any of the one or more public plans provide a greater benefit to a user of the telecommunications device based on an analysis of at least a portion of operational information using one or more algorithms, the analysis comprising at least of a comparison of the location information to coverage maps available publicly or received from one or more third-party coverage maps systems;

determining whether the user is eligible for any customized plans based on an analysis of at least a portion of the operational information using at least one of the algorithms; and at a user interface of the telecommunications device, presenting at least one of the one or more of the public plans that provide a greater benefit to the user or the customized plans determined eligible;

wherein the one or more algorithms are associated with one or more participating cellular carriers.

2. The method of claim 1, further comprising:
generating, using at least one sensor of the telecommunications device, the operational information;
wherein the operational information further comprises signal strength information.

3. The method of claim 1, wherein the operational information further comprises roaming usage incurred over a predetermined time period.

4. The method of claim 1, wherein presenting further comprises providing a verification code to enable the user to at least one of complete a contracting process and activate a selected plan.

5. The method of claim 4, further comprising:
receiving, at a remote server, a user selected plan and the verification code;
determining, with the remote server, based on the user selected plan and the verification code that the user selected plan is valid; and
sending, with the remote server, a plan completion instruction to a participating carrier associated with the user selected plan, if the user selected plan was determined valid.

6. The method of claim 4, further comprising:
receiving, at a remote server, a user selected plan and the verification code from a plan activation location;
determining, with the remote server, based on the user selected plan and the verification code that the user selected plan is valid; and
sending, with the remote server, a plan completion instruction to the plan activation location for the participating carrier associated with the user selected plan.

7. The method of claim 1, further comprising:
sending at least one of operational information, displayed plans or selected plan information to a remote server via a transceiver of the telecommunications device.

8. The method of claim 7, wherein the selected plan information comprises one or more screenshots of a graphical user interface presented by the user interface.

9. A telecommunications device comprising:
a user interface;
a processor in communication with the user interface;
a memory, in communication with the processor, the memory configured to store a plan option application program, the plan option application program comprising public plan information and one or more algorithms associated with one or more participating cellular carriers, the plan option application program being configured to cause the processor to:
a) obtain operational information of the telecommunications device, the operational information comprising at least one of location information;

b) determine whether any of the public plans provide a greater benefit to a user of the telecommunications device based on an analysis of at least a portion of operational information, the analysis comprising at least of a comparison of the location information to coverage maps available publicly or received from one or more third-party coverage maps systems;

c) determine that the user is eligible for one or more customized plans based at least in part on an analysis of the operational information using the algorithms associated with the one or more participating cellular carriers; and d) present at least one of one or more of the public plans that provide a greater benefit to the user or the one or more of the customized plans via the user interface.

10. The device of claim 9, further comprising at least one sensor configured to generate the operational information.

11. The device of claim 10, wherein the at least one sensor comprises:
a location sensor configured to provide location information for the telecommunications device; and
a signal strength sensor configured to provide signal strength information for the telecommunications device;
wherein the operational information comprises signal strength information associated with location information when the telecommunications device is in use.

12. the device of claim 9, wherein the processor is further configured to:
determine that a current action being preformed by the telecommunications device is incurring extra costs to the user, based on a cellular plan currently associated with the user; and
initiating step d).

13. The device of claim 9, wherein the operational information comprises information regarding roaming usage incurred over a previous time period.

14. The device of claim 9, wherein the plan option application program is further configured to cause the processor to:
retrieve information regarding an expiration date of a currently active cellular service plan; and
perform steps a) through c) at a predetermined time prior to the expiration date.

15. The device of claim 9, wherein the operational information comprises at least one of a number of minutes or data used in a predetermined period.

16. The device of claim 9, wherein the plan option application program is further configured to cause the processor to:
display plans via the user interface;
receive a plan selection from the user via the user interface; and
provide a verification code to enable the user to complete a contracting process and to activate the selected plan.

17. The device of claim 16, further comprising:
a transceiver in communication with the processor and one or more communications networks;
wherein the plan option application program is further configured to cause the processor to:
send at least a portion of the operational information, displayed plans, or selected plan to a remote server via the transceiver.

* * * * *